United States Patent [19]

Hauser

[11] 4,140,737

[45] Feb. 20, 1979

[54] DEVICE FOR A VESSEL FOR AERATING LIQUIDS HAVING A FOAM-FORMING TENDENCY

[75] Inventor: Hans U. Hauser, Niederweningen, Switzerland

[73] Assignee: Bucher-Guyer AG Maschinenfabrik, Neiderweningen, Switzerland

[21] Appl. No.: 819,133

[22] Filed: Jul. 26, 1977

[30] Foreign Application Priority Data

Jul. 27, 1976 [CH] Switzerland .......................... 9568/76

[51] Int. Cl.² .............................................. B01F 3/04
[52] U.S. Cl. ..................................... 261/93; 209/169;
210/219; 210/221 M; 210/242 A; 261/36 R;
261/120
[58] Field of Search ................... 261/29, 36 R, 87, 91,
261/93, 120, DIG. 75; 209/169, 170; 210/219,
220, 221 R, 221 M, 221 P, 242 A; 415/121 B

[56] References Cited

U.S. PATENT DOCUMENTS

| | | | |
|---|---|---|---|
| 2,240,671 | 5/1941 | Sborlino | 209/169 |
| 2,265,758 | 12/1941 | Klosson | 415/121 B X |
| 2,406,532 | 8/1946 | Fahrenwald | 261/93 X |
| 2,892,543 | 6/1959 | Daman | 261/87 X |
| 2,928,665 | 3/1960 | Epprecht | 261/87 |
| 3,573,203 | 3/1971 | Kaelin | 210/242 A X |
| 3,794,303 | 2/1974 | Hirshon | 261/120 X |
| 3,846,516 | 11/1974 | Carlson | 210/242 A X |
| 3,936,381 | 2/1976 | Pacaud | 210/242 A X |

FOREIGN PATENT DOCUMENTS

819785 9/1959 United Kingdom ...................... 261/93

*Primary Examiner*—Richard L. Chiesa
*Attorney, Agent, or Firm*—Holman & Stern

[57] ABSTRACT

Disclosed is an aeration device for aerating liquids having a foam-forming tendency. The amount of foam generated by such an aeration device is controlled by having the air inlet disposed at a predetermined foam level. The liquid inlet is disposed near the surface of the liquid to be aerated, such that solid particles floating thereon are taken into the aerator. Air and liquid are combined in the aeration device producing the desired foam. The foam level is prevented from exceeding the level of the air intake due to the fact that air is required to produce the foam, and if the foam level exceeded the air intake, it would be ingested into the pump reducing the amount of foam produced thereby. Particular embodiments disclose concentric foam and liquid intakes to a submersible aeration pump.

13 Claims, 7 Drawing Figures

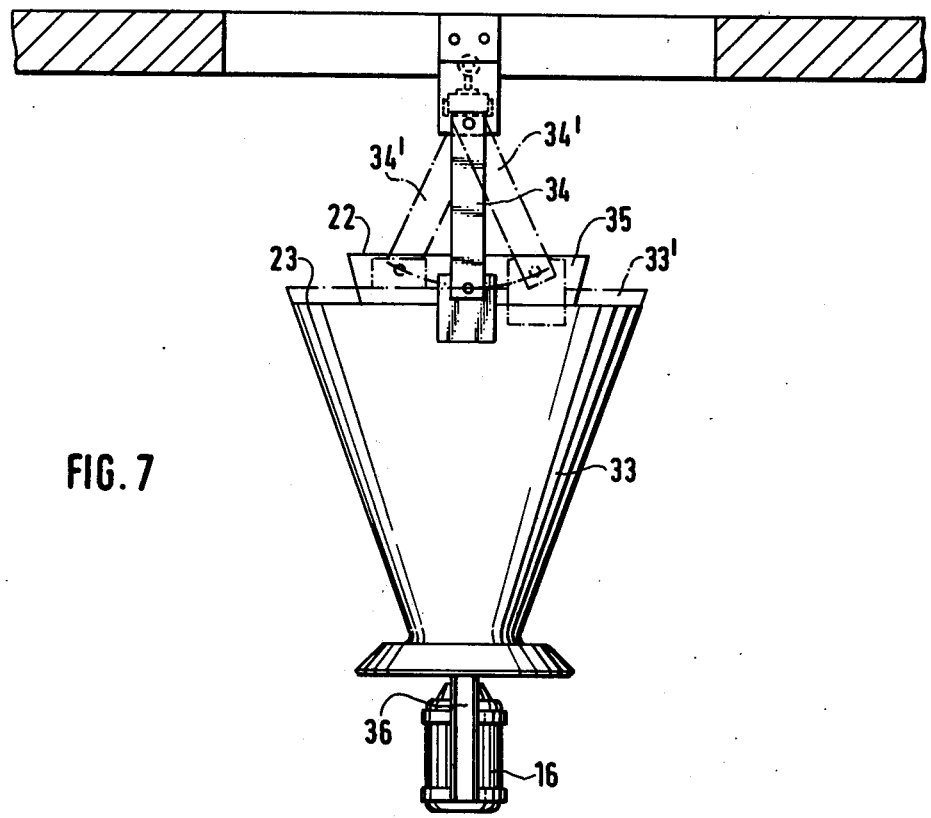
FIG. 7
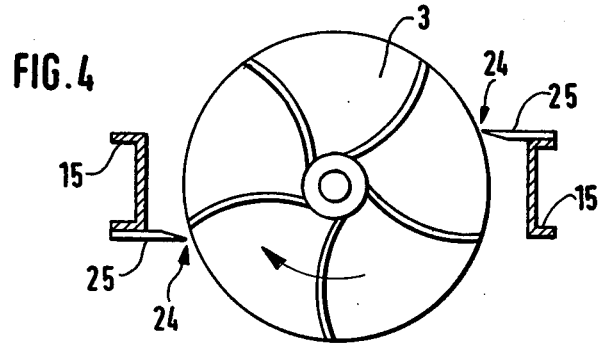
FIG. 4

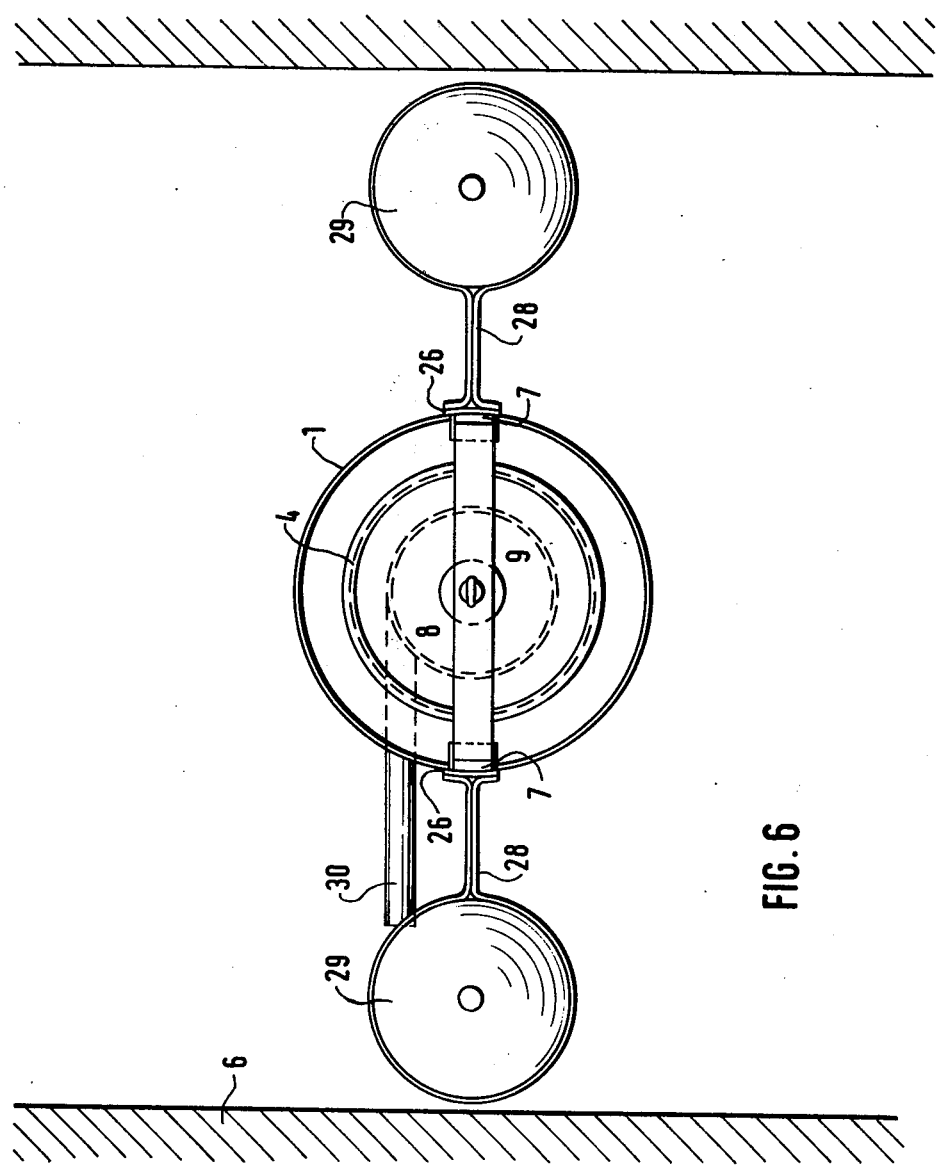

DEVICE FOR A VESSEL FOR AERATING LIQUIDS HAVING A FOAM-FORMING TENDENCY

BACKGROUND OF THE INVENTION

The present invention generally relates to a device for aerating liquids having a foam-forming tendency, and in particular, to a device for the aeration of effluent containing organic substances as may result from animal husbandry, livestock and clarification plants.

An aeration device is generally utilized for the biological treatment of effluents, which have been charged with organic substances. Here, the terms "aeration" and "air" are intended to include any gaseous medium which is combined with a liquid to form a foam product. Ideally, in the biological processing field, the gaseous atmospheric oxygen with which the effluent is to be enriched.

As is known in the prior art, the aeration of effluents generally result in a marked foam production. Control cannot satisfactorily be accomplished even with considerable expenditure and effort on items such as foam cutting agents, foam inhibitors, over-sized vessels, etc. Furthermore, a layer consisting of solid particles, [hay, dirt, etc.] may be formed on the liquid surface, which can interfere with the aeration process.

SUMMARY OF THE INVENTION

An object of the present invention is to provide an aeration device with which an increased aeration effect can be obtained without considerable additional expenditure.

A further object of the present invention is to provide an aeration device whereby the foam formation can be kept within permissible limits, and the formation of a solids layer is reduced or prevented.

A still further object of the present invention is to provide an aeration device, the power consumption and noise production of which are reduced to a minimum.

In accordance with the present invention, these and other objects are achieved by providing a submersible pump with a liquid suction line, in addition to an air suction line. The lines are adapted to suction off the air at a predetermined distance above the liquid level, roughly corresponding to the permissible thickness of the foam layer, and to suction off the liquid in the vicinity of the liquid level. In the event that foam production exceeds the permissible thickness for the foam layer, the air inlet line to the submersible pump will be gradually overcome by the increasing foam layer. In as much as air is necessary for foam production, there will reach a point beyond which the foam layer will be drawn into the air inlet, such that further increases in the thickness of the foam layer are impossible. The liquid is suctioned off near the surface via the liquid suction line, and thus, solid particles floating on the surface are also entrained therein. These particles are broken up by the submersible pump, and combined with air in the foam produced thereby.

An embodiment of the present invention has the air suction line coaxially arranged within the liquid suction line, with the annular intermediate space serving as a liquid pathway. A relatively high liquid entry velocity is achieved by introducing the liquid into the outer portion of the foam producing aerating pump wheel, reducing the power required and noise produced from the agitation, which results in the foam production.

BRIEF DESCRIPTION OF THE DRAWINGS

A more complete appreciation of the invention and the attendant advantages therein will be more clearly understood by reference to the following drawings, wherein:

FIG. 4 is a plan view partially in cross-section of the enlargement shown in FIG. 3 along section lines A—A;

FIG. 6 is a plan view of the embodiment shown in FIG. 5; and

FIG. 7 is a side view of a still further embodiment of the present invention.

DETAILED DESCRIPTION OF A PREFERRED EMBODIMENT

Figure 1:
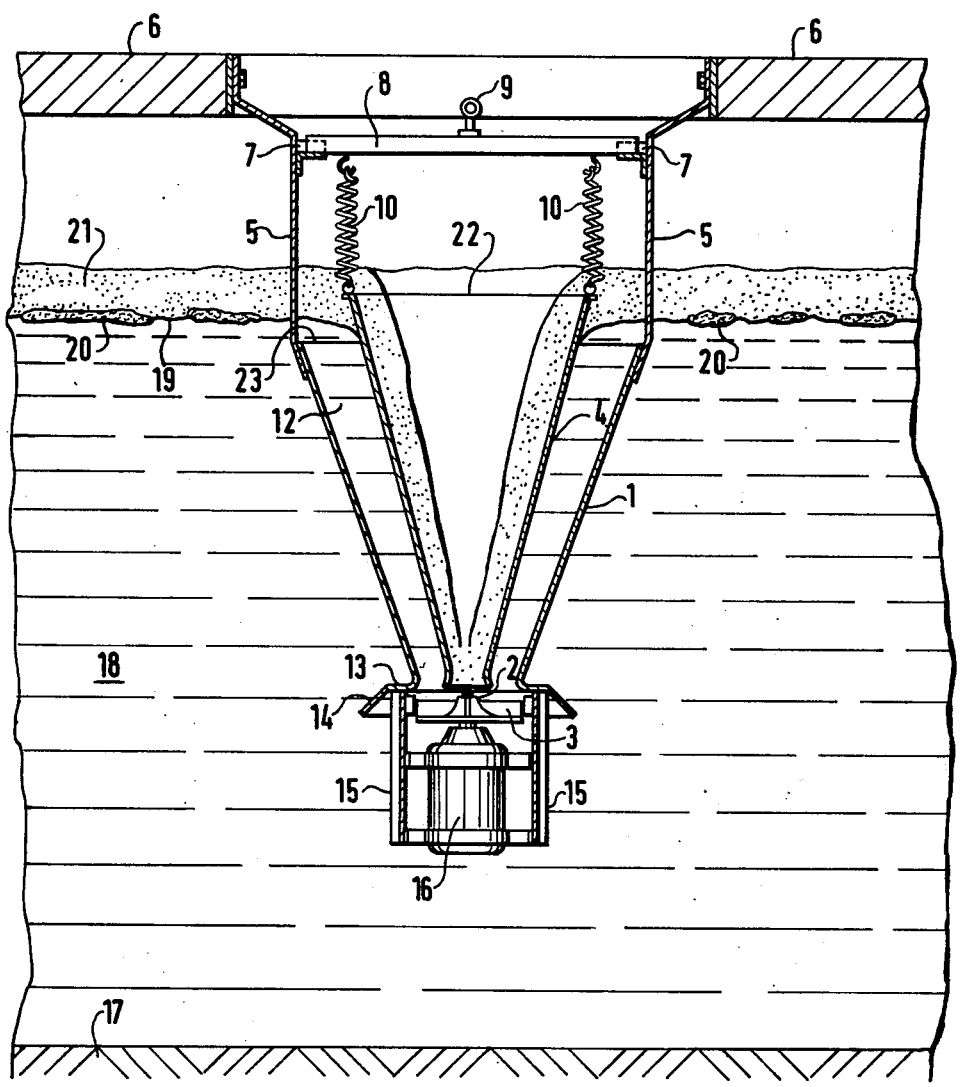
FIG. 1 is a side partial cross-sectional view of an aeration device in accordance with the present invention.

Referring now to the drawings wherein like reference numerals designate identical parts throughout the several views, FIG. 1 shows an aeration device in accordance with the present invention. An upwardly widening funnel-shaped liquid suction line 1 is shown having a small portion which faces the inlet side 2 of a centrifugal paddle wheel 3. A similarly outwardly widening air suction line 4 is arranged coaxially in the liquid suction line 1. Mounting rails 5 can be utilized to connect the suction line 1 to a mounting frame 7, and a rigid support structure 6.

A suspension beam 8 is provided with an eyelet 9, and is supported between supports 7. Tension springs 10 or chains 11 (in FIG. 5) can be used to suspend air suction line 4 from beam 8. Intermediate annular space 12 is formed between air suction line 4 and liquid suction line 1.

An outwardly directed annular surface 13 may be arranged on the funnel-shaped liquid suction line 1 at its lower end in the region of its smallest cross section. This surface further may include a downwardly inclined circular flow guide plate 14. U-shaped rails 15 are connected to annular surface 13, and form a suspension arrangement for motor 16 upon whose shaft paddle wheel 3 is mounted.

The vessel containing the liquid to be aerated has a floor 17 and side walls [not shown], and may be, for example, some type of pit filled with liquid 18 to a liquid level 19. Solids 20 float on the surface of the liquid, and can also form a solids layer, covering the whole liquid surface. A layer or covering of foam 21 exists above solids 20, and the liquid level 19. The funnel-shaped air suction line 4 is maintained at a distance above liquid level 19, corresponding to the permissible thickness of the foam layer 21. The inflow edge 22 of the air suction line 4 is arranged parallel to the liquid level 19. The liquid suction line 1, together with its inflow edge 23, is arranged at a predetermined distance below the liquid level 19, roughly corresponding to the thickness of the solids 20 floating on the liquid surface 19.

Figure 2:
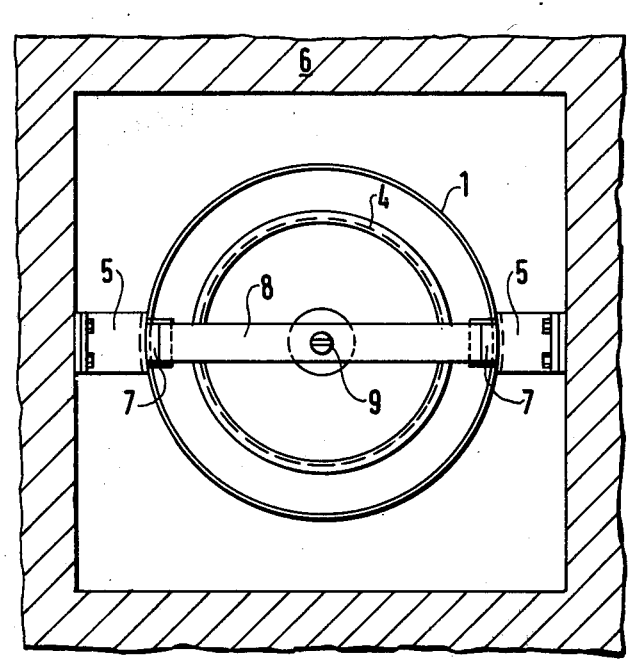
FIG. 2 is a plan view of the embodiment of FIG. 1.
Figure 3:
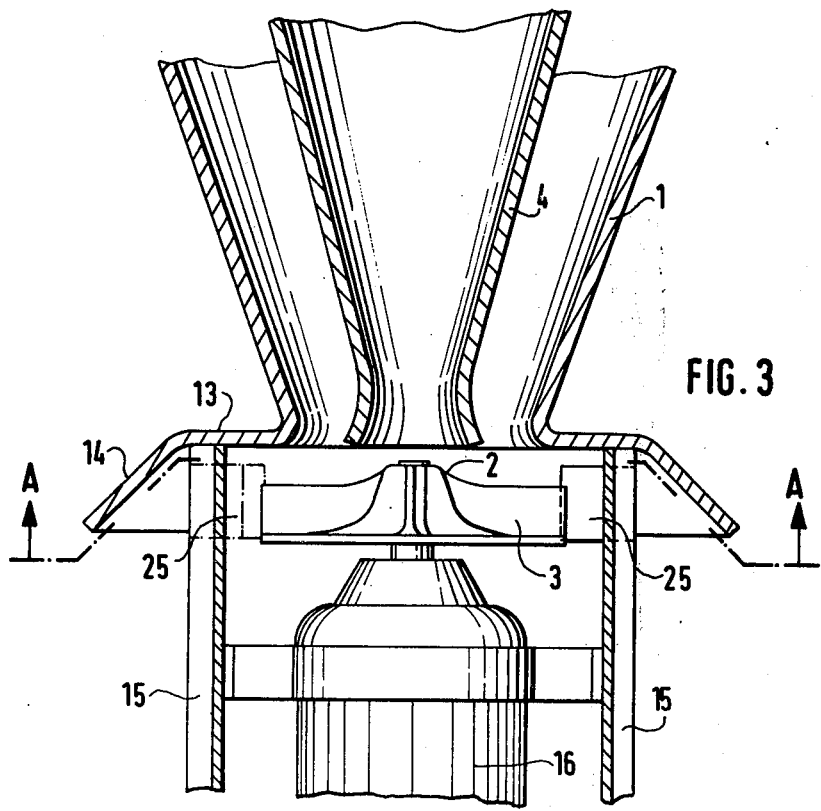
FIG. 3 is an enlarged view of the paddle wheel portion of the aeration pump shown in FIG. 1.

A top view of the apparatus taught in FIG. 1 may be seen in FIG. 2, and an enlarged scale of the inclined circular flow guide plate and motor assembly may be seen in FIG. 3. As can more clearly be seen in FIGS. 3 and 4, a cutting device comprising two knives 25 on the U-shaped rails 15 of the motor suspension system are arranged on the outlet side of paddle wheel 3, with the cutting edges indicated by arrows 24.

Figure 5:
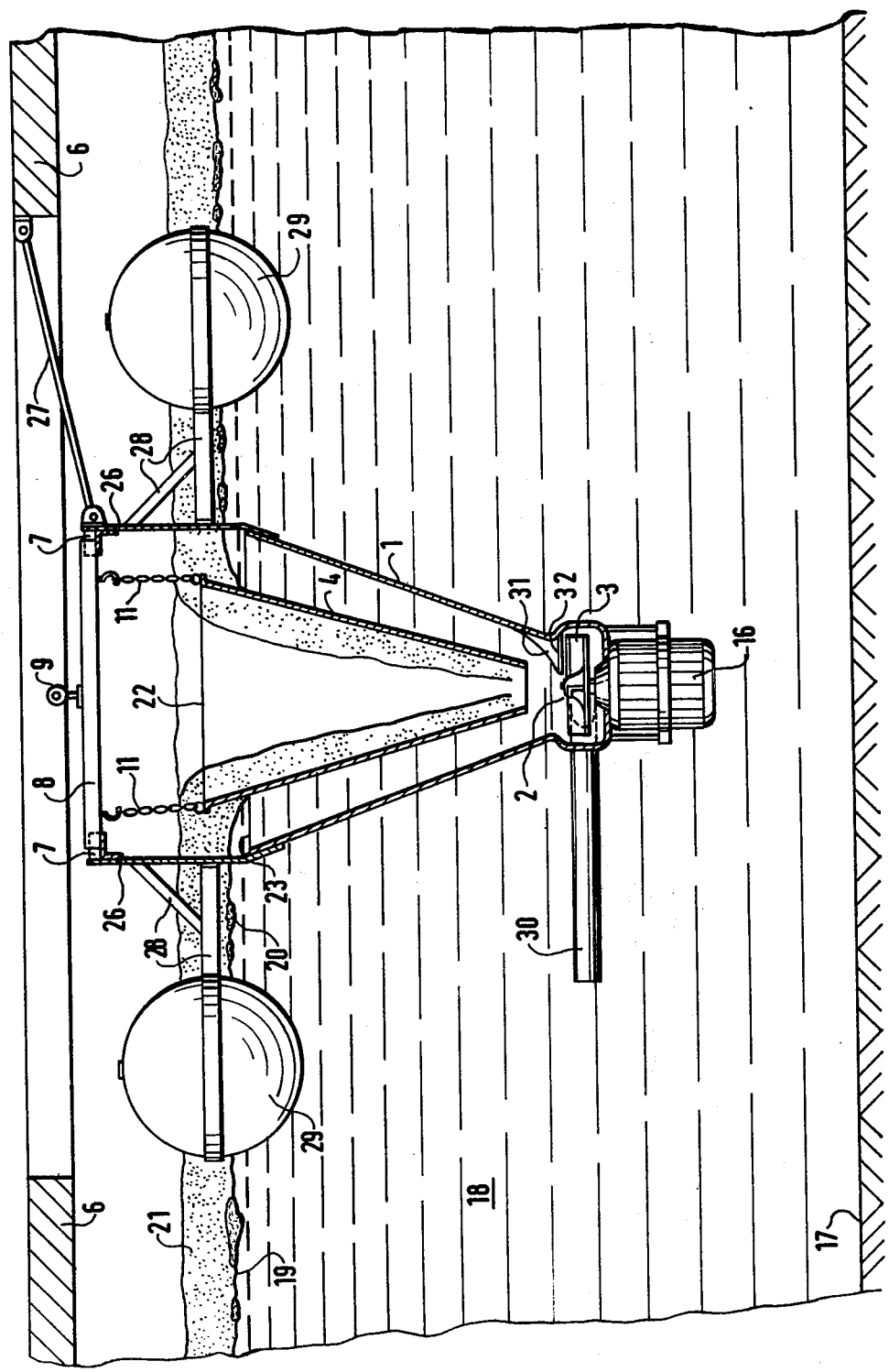
FIG. 5 is a side view partially in cross section of a further embodiment of the present invention.

In FIG. 5, the funnel-shaped liquid suction line 1 is connected to mounting rails 26, which again includes U-shaped guides 7 for supporting suspension beam 8. One of the mounting rails 26 is connected to vessel cover 6 by means of a lever 27 mounted in an articulated manner. The aeration device itself is supported by two stationary floats 29 on the surface of liquid 18, which are connected via rigid struts 28 to the mounting rails 26. Lever 27 maintains the aeration device at a horizontal location on the surface of the liquid 18, while the floats 29 maintain the precise height of the liquid inlet 1 and air inlet 4 below the surfaces of the liquid and foam, respectively.

The outlet side of the paddle wheel 3 may be defined by a turbulence pipe 30, which is arranged tangentially with respect to the paddle wheel 3. A guide plate 31, having an edge 32, located radially with respect to the paddle wheel, is arranged on the inside of the liquid suction line 1 at the inlet side 2 of the paddle wheel 3. This orientation may be more clearly seen in FIG. 6, which is a top view of the apparatus in FIG. 5.

FIG. 7 is a further embodiment of the apparatus of FIG. 1, in which the liquid suction line 33 is flexibly suspended on bracket 34. Reference numerals 33' and 34' denote positions to which the liquid suction line 33 may be raised as a result of rotational movement of the bracket 34. A rotational force may be exerted thereupon by means of the liquid as a result of the suction affect of the paddle wheel [not shown]. In this case, the motor 16 is connected by a motor suspension arrangement 36 to the rigidly arranged funnel-shaped air suction line 35.

The operation of the embodiment in FIG. 7 will be clear by reference back to the operation of the embodiment in FIG. 1. Electric motor 16 drives the paddle wheel 3, such that liquid is sucked in through the intermediate face 12, and is conveyed radially outwardly. The liquid is deflected downwardly at an angle determined by the circular flow guide plate 14 towards floor 17 of the hole. Liquid flows continuously over the inflow edge 23 of the funnel-shaped liquid suction line 1, since liquid level 19 is above inflow edge 23. Solids 20, floating on the surface of the liquid, will similarly fall into the paddle wheel 3. The inflow edge 22 of the funnel-shaped suction line 4 is at a distance above the liquid level 19 corresponding to the permissible thickness of the foam layer 21. The amount of air sucked in by the funnel-shaped air suction line 4 can be determined by the distance between the lower edge of the funnel-shaped air suction line 4 and the paddle wheel. The noise level produced by the foam formation decreases as the lower edge of the air suction line 4 approaches the paddle wheel 3.

Other possible embodiments include disposing the motor above the air suction line 4 outside of the liquid. It is also possible to have a double-sided paddle wheel 3, so that liquid can also be mixed from below, producing an even better foaming action. The coaxial arrangement of the lines 1 and 4 prevent the solids layer from remaining suspended on the inflow edge 22 of the air suction line 4. The liquid suction line 1, with its mounting 5, the motor 16 and the support arrangement 15, form a rigid structural unit. In contrast to the rigid unit, the air suction line 4 is flexibly supported from suspension beam 8 by tension springs 10 or chains 11. Suspension beam 8, resting in the U-shaped guide 7, facilitates removal of the air line 4 for cleaning purposes. The flexible suspension of air line 4 ensures that large clumps formed by solid particles can pass through the liquid pathway, since the air suction line 4 is simply pushed aside by these clumps of particles.

The cutting device shown in FIGS. 3 and 4, comprising knives 25, assist in breaking up the clumps of particles reaching paddle wheel 3. Although groups of particles caught by the paddle wheel 3 are partially broken down, the paddles may in addition be provided with cutting edges in order to produce an even better breaking-up effect.

Complete intermixing of the contents of the vessel is improved by the downwardly directed flow guide plate 14. The utilization of a turbulence pipe 20 at the outlet side of paddle wheel 3 may be advantageous if the aeration device is arranged on one side of the vessel, and the total contents of the pit are to be included in the mixing process. Turbulence pipe 30 can also be used to transport the contents of the pit to another pit or vessel. Additionally, the turbulence pipe can be downwardly directed if a distribution in all directions of the vessel is desired. Guide plate 31 aids in preventing lumps, or the like, from forming upon rotation.

The mounting of the aeration device on floats 29, as shown in FIGS. 5 and 6, ensures that the inflow edge 22 of the air suction line 4 and the inflow edge 23 of suction line 1 remain at a constant distance with respect to the liquid level 19.

The arrangement of FIG. 7 shows the possibility of suspending the external liquid suction line flexibly, instead of the internal air suction line, as shown in FIG. 1. If the intermediate face is blocked by solid particles, such arrangement offers the following additional advantages. If the funnel-shaped liquid suction line 33 is movably suspended on a bracket 34, line 33 is rotated about its axis and lifted by the effect of the rotating paddle wheel 3, and opposite the internal rigidly arranged suction line 35. Should the intermediate space between lines 33 and 35 be blocked, the paddle wheel will convey less material. In this way, the force exerted on the funnel-shaped liquid suction line 33 decreases, so that the latter sinks again, and the distance between the two lines 33 and 35 increases, with the result that the solids particles causing the blockage are moved along.

The amount of liquid suctioned off from the surface depends on the immersion depth of the inflow edge of the liquid line 33. As the immersion depth increases the amount of liquid suctioned off decreases, with the result that the solids particles floating on the liquid surface can no longer be sufficiently broken up. In order to obtain an optimum decomposition of the solid particles, it is, therefore, necessary to choose the immersion depth such that the inflow edge acts as a breaking edge for the solids layer. This can be achieved by a subdivided bracket 34 whose length can be adjusted by means of insertable bolts. A threaded spindle, with a crank, provides a further solution, and can easily be adjusted. An arrangement with floats, similar to the system of FIGS. 5 and 6, but with the flexibly mounted liquid inlet line, is also possible.

Although the invention has been described relative to a specific embodiment thereof, it is not so limited, and many modifications and variations thereof will be readily apparent to those skilled in the art in light of the above teachings. It is, therefore, to be understood that within the scope of the appended claims, the invention may be practiced otherwise than as specifically here and before described.

What is claimed is new and desired to be secured by Letters Patent of the United States is:

1. An aeration pump for controlling foam level and thus foam thickness when aerating liquids having a foam-forming tendency, wherein said pump is placed in said liquid, said liquid having a surface, said surface including foam thereon having a thickness, said pump comprising:

pump means for mixing air and said liquid;

liquid inlet means for transporting liquid from the vicinity of said surface to said pump means; and air inlet means, located in the vicinity of a desired foam thickness level and coaxially within said liquid inlet means forming an intermediate space of annular cross section which serves as the liquid inlet means, for conducting air to said pump means when said foam thickness is less than desired and for conducting foam to said pump means when said foam thickness is greater than desired, said liquid inlet means and said air inlet means have inflow edges that are arranged parallel to said liquid level, wherein said liquid inlet means and said air inlet means are funnel-shaped, and taper inwardly from said inflow edges towards said pump means.

2. The aeration pump of claim 1, wherein one of said liquid inlet means and said air inlet means are flexibly arranged and adjustable with respect to each other.

3. The aeration pump of claim 2, wherein said air inlet means and said pump means form a rigid structural unit and said liquid inlet means is flexibly mounted thereon.

4. The aeration pump of claim 3, wherein said liquid inlet means is adjustably and flexibly suspended on a bracket rigidly attached to said rigid structural unit.

5. The aeration pump of claim 3, wherein said liquid inlet means is adjustably attached to said rigid structural unit by means of a threaded spindle.

6. The aeration pump of claim 2, wherein said liquid inlet means includes a mounting means, said pump means includes a paddle wheel pump, a motor means for driving said paddle wheel pump and securing means for mounting said motor, and said liquid inlet means mounting means and said securing means form a rigid structural unit with said air inlet means flexibly arranged therein.

7. The aeration pump of claim 6, wherein said air inlet means is suspended from said liquid inlet means mounting means by tension springs.

8. The aeration pump of claim 6, wherein said air inlet means is suspended from said liquid inlet means mounting means by chains.

9. The aeration pump of claim 6, wherein said paddle wheel pump includes an inlet and outlet side and a cutting device is provided on said outlet side.

10. The aeration pump of claim 9, wherein said paddle wheel pump includes paddles having cutting edges.

11. The aeration pump of claim 9, wherein said paddle wheel pump includes a guide member attached to said outlet side.

12. The aeration pump of claim 11, wherein said guide member comprises a turbulence pipe tangentially oriented with respect to said paddle wheel pump.

13. The aeration pump of claim 12, wherein said pump means further includes a guide plate oriented radially with respect to said paddle wheel pump and located on an inner face of said liquid inlet means adjacent said inlet to said paddle wheel pump.

* * * * *